United States Patent

(12) United States Patent
Imajo

(10) Patent No.: US 6,490,063 B1
(45) Date of Patent: Dec. 3, 2002

(54) ANALOG OPTICAL TRANSMISSION SYSTEM

(75) Inventor: Yoshihiro Imajo, Eniwa (JP)

(73) Assignee: Kokusai Electric Co., Ltd., Tokyo (JP)

( * ) Notice: Subject to any disclaimer, the term of this patent is extended or adjusted under 35 U.S.C. 154(b) by 0 days.

(21) Appl. No.: 09/354,562

(22) Filed: Jul. 16, 1999

(30) Foreign Application Priority Data

Jul. 17, 1998 (JP) .......................................... 10-219827
May 28, 1999 (JP) .......................................... 11-149385

(51) Int. Cl.[7] ............................................. H04B 10/08
(52) U.S. Cl. ....................... 359/110; 359/177; 359/179; 359/113
(58) Field of Search ................................ 359/110, 177, 359/176, 174, 179, 152, 124, 145, 154, 113

(56) References Cited

U.S. PATENT DOCUMENTS

| 5,296,957 A | * | 3/1994 | Takahashi et al. | 359/177 |
| 5,436,746 A | * | 7/1995 | Hirst | 359/110 |
| 5,535,037 A | * | 7/1996 | Yoneyama | 359/177 |
| 5,646,763 A | * | 7/1997 | Misaizu et al. | 359/187 |
| 5,689,355 A | * | 11/1997 | Okubo et al. | 359/179 |
| 5,737,105 A | * | 4/1998 | Ohta et al. | 359/179 |
| 5,790,294 A | * | 8/1998 | Horiuchi et al. | 359/177 |
| 5,905,585 A | * | 5/1999 | Shirai | 359/110 |
| 5,914,794 A | * | 6/1999 | Fee et al. | 359/110 |
| 5,923,453 A | * | 7/1999 | Yoneyama | 359/177 |
| 5,995,254 A | * | 11/1999 | Koga et al. | 359/124 |
| 6,211,985 B1 | * | 4/2001 | Anderson | 359/174 |
| 6,282,005 B1 | * | 8/2001 | Thompson et al. | 359/173 |
| 6,285,475 B1 | * | 9/2001 | Fee | 359/110 |
| 6,359,708 B1 | * | 3/2002 | Goel et al. | 359/110 |

* cited by examiner

Primary Examiner—Leslie Pascal
Assistant Examiner—Hanh Phan
(74) Attorney, Agent, or Firm—Wenderoth, Lind & Ponack, L.L.P.

(57) ABSTRACT

To make it possible to detect faults of optical fibers only by allowing the Master unit side to monitor those fibers in an optical transmission system for bilateral communication of analog optical signals by use of two-route optical fibers between the Master and Slave units.

An oscillator of a Master unit oscillates a monitoring signal having a frequency different from that of the RF multiplex signal, a composition means synthesizes these two signals, and a light emission means transmits the synthesized signal to a light reception means of a Slave unit via a downlink optical fiber. A filter means at the Slave unit separates the monitoring signal from the received optical signal, the Slave composition means synthesizes the separated signal and the RF multiplex signal, and a light emission means converts the synthesized signal into an optical signal having a constant average optical power and transmits it to a light reception means at the Master unit via an uplink optical fiber. A detection means at the Master unit detects an average photo-electric power of the received optical signal, a filter means separates the monitoring signal from the concerned optical signal, and a detection means detects the level of thus separated signal.

12 Claims, 2 Drawing Sheets

Fig. 2

| Uplink optical fiber | Downlink optical fiber | Average photo-electric power | Ratio of average photo-electric power to signal level |
|---|---|---|---|
| Normal | Normal | Reference level | Reference value |
| Normal | Abnormal | Reference level | Fluctuated |
| Abnormal | Normal | Dropped | Reference value |
| Abnormal | Abnormal | Dropped | Fluctuated |

Correspondence table Q

ANALOG OPTICAL TRANSMISSION SYSTEM

BACKGROUND OF THE INVENTION

1. Technical Field of the Invention

The present invention relates to an analog optical transmission system, a Master unit and a Slave unit which transmit analog optical signals from the Master unit to the Slave unit via a downlink optical fiber and also does so from the Slave unit to the Master unit via an uplink optical fiber, and more particularly, to technologies whereby faults occurring on the uplink or downlink optical fiber can be detected by the Master unit or a user who monitors the Master unit, even if the Slave unit should not detect the faults on the downlink optical fiber.

2. Related Art

Optical fibers, for example, are well known as low-loss transmission lines through which optical signals can be transferred and have been utilized in various optical communication fields. Although the optical transmission system utilizing such optical fibers as transmission lines can transfer optical signals efficiently as above-mentioned, a normal optical communication cannot be performed, if transmission is loss is increased or optical signals are interrupted by damage, disconnection, or cut-off on the optical fiber. Thus, in an optical transmission system, the monitor on transmission faults is performed, for example, on real-time about whether damage of optical fibers used as transmission lines are caused or not, and such monitoring is very important from the point of system reliability.

In the optical transmission system that transmits respective optical signals from the Master unit to the Slave unit via a downlink optical fiber and from the Slave unit to: the Master unit via an uplink optical fiber, the communication is performed using a communication circuit for control between a CPU of a microcomputer or the like equipped in the Master unit and a CPU of a microcomputer or the like equipped in the Slave unit so that the Master unit monitors states of each processing section of the Slave unit and controls the gain thereof.

In the analog optical transmission systems with such a configuration, the Master unit, for example, monitors the uplink optical fiber, while the Slave unit monitors the downlink optical fiber. If a fault of the downlink optical fiber is detected, the Slave unit may inform it to the Master unit using the above-mentioned communication circuit. More specifically, in monitoring in the Slave unit, when receiving analog optical signals transmitted from the Master unit via the downlink optical fiber, the CPU always monitors the level of the received light of the concerned light reception element, and if a fault of the downlink optical fiber is detected by the CPU, it may be informed to the CPU of the Master unit.

On the other hand, the Master unit, when notified of the fault of the downlink optical fiber by the Slave unit, outputs a warning alarm of the fault to the user.

However, the above-mentioned analog optical transmission system suffers from such drawback that, although the Master unit can monitor the uplink optical fiber as above-mentioned, the downlink optical fiber must be monitored by the Slave unit and the monitoring results must be informed to the Master unit, thus both the Master and Slave units must monitor the optical fibers.

Specifically, such types of analog optical transmission systems have a drawback of a complicated configuration for monitoring optical fibers, because it is necessary to create communication protocols for, for example, informing the monitoring results from the Slave unit to the Master unit, to provide with both the Master and Slave units control programs to be executed by the CPU for processings of such information and the monitoring of optical fiber, and also to equip the above-mentioned controlling communication circuits. Such drawback is particularly conspicuous in those systems that may not need to execute control between the Master and Slave units besides the above-mentioned optical fiber monitoring and informing processings, and there has been an urgent need for a simple monitoring configuration that allows execution of the monitoring of two-route optical fibers only by, for example, the Master unit.

To solve those problems of the prior arts, the present invention has an object to provide an analog optical transmission system as well as the related Master and Slave units that enable the Master unit or the user who monitors the Master unit to detect faults of the uplink or downlink optical fiber even if there is no need, for example, for the Slave unit to monitor the downlink optical fiber, in such a case where the bilateral communication of analog optical signals is performed by using two-route optical fibers between the Master and Slave units.

SUMMARY OF THE INVENTION

An analog optical transmission system according to the present invention is capable of detecting faults of optical fibers as follows when executing the bilateral communication of analog optical signals by use of two-route optical fibers, uplink and downlink, between the Master and Slave units:

That is, while the Master unit has the Master light emission means for transmitting a prescribed monitoring optical signal to the Slave unit via the downlink optical fiber, the Slave unit has the Slave light reception means for receiving the abovementioned monitoring optical signal sent from the Master unit via the downlink optical fiber. The Slave light emission means returns the above-mentioned monitoring optical signals received by the Slave light reception means to the Master unit via the uplink optical fiber. Then, in the Master unit, its light reception means receives the above-mentioned monitoring optical signal returned from the Slave unit via the uplink optical fiber, allowing a monitoring signal-level detection means to detect the level of the above-mentioned monitoring optical signal received by the Master light reception means.

Thus, it is possible to detect faults of the optical fibers based on fluctuations in the level detected by the monitoring signal-level detection means. More specifically, if, for example, the level of the above-mentioned monitoring optical signal detected by the Master unit is lower than a normal reference level, it is possible to determine that a fault occurs at least one of the uplink and downlink optical fibers, so that such a configuration is effective in a case where it is requested only to detect any faults of either the uplink or downlink optical fiber and there is no need to determine which of the two fibers has a trouble.

Moreover, prescribed monitoring optical signals described herein may include any signal depending on the service conditions of, for example, the system as well as the Master or Slave unit.

In addition to the above-mentioned analog optical transmission systems, the present invention provides such Master and Slave units as above-mentioned.

That is, in bilateral communication of analog optical signals by use of two-route optical fibers, uplink and downlink, between a Master and Slave units, the Master unit according to the present invention has its light emission means for transmitting a prescribed monitoring optical signal to the Slave unit via the downlink optical fiber and the Master light reception means receive the above-mentioned monitoring optical signal returned from the Slave unit via the uplink optical fiber. The monitoring signal-level detection means detects the level of the above-mentioned monitoring optical signal received by the Master light reception means, thereby enabling to detect faults of the optical fibers based on the fluctuations in the level detected by the monitoring signal-level detection means.

On the other hand, the Slave unit according to the present invention, when executing bilateral communication of analog optical signals by use of two-route optical fibers, uplink and downlink, between the Master and Slave units, has the Slave light reception means for receiving the prescribed monitoring optical signal transmitted from the Master unit via the downlink optical fiber and the Slave light emission means for returning the above-mentioned monitoring optical signal received by its light reception means to the Master unit via the uplink Optical fiber, thus enabling to detect faults of the optical fibers based on the fluctuations in the level of the above-mentioned monitoring optical signal detected by the Master unit.

Moreover in an analog optical transmission system according to the present invention, it is possible to detect optical fiber faults in bilateral transmission of analog optical signals by use of two-route optical fibers, uplink and downlink, between a Master unit and Slave unit.

That is, the Master unit has the Master light emission means for transmitting an analog optical signal given by multiplexing a prescribed monitoring signal and an information signal to be sent to the Slave unit via the downlink optical fiber. The Slave unit has the Slave light reception means for receiving the analog optical signal sent from the Master unit via the downlink optical fiber so that the Slave filter means separates the above-mentioned monitoring signal from the analog optical signal received by the Slave light reception means and then the Slave light emission means transmits via the uplink optical fiber to the Master unit an analog optical signal obtained by multiplexing an information signal to be sent to the Master unit and the above-mentioned monitoring signal thus separated by the Slave filter means.

On the other hand, on the side of the Master unit, the Master light reception means receives the analog optical signal sent from the Slave unit via the uplink optical fiber and then the Master filter means separates the above-mentioned monitoring signal from the analog optical signal received by the Master light reception means, thus allowing the monitoring signal-level detection means to detect the level of the above-mentioned monitoring signal separated by the Master filter means.

Thus, in much the same way as mentioned above, it is possible to detect optical fiber faults based on fluctuations in the level detected by the monitoring signal-level detection means on the side of the Master unit. In addition, the present invention multiplexes an information signal and the monitoring signal, to make sure that the two would never mix with each other, thus enabling real-time monitoring and fault detection of optical fibers when executing the communication of, for example, the information signal.

Note here that an information signal mentioned herein refers to a signal originally transferred between the Master and Slave units, for example, prior to the application of the present invention, more specifically to a signal containing data information or control information transferred, for example, between the Master and Slave units.

Further, a prescribed monitoring signal mentioned herein refers to any signal depending on the service conditions of, for example, the system as well as the Master and/or Slave units.

Moreover, the above-mentioned analog optical transmission system according to the present invention makes it possible to detect a fault by specifying which of the uplink or downlink optical fibers has an fault as follows.

That is, the light emission means on the side of the Slave unit transmits by a prescribed average optical power analog optical signal multiplexing the above-mentioned monitoring signal and an information signal at a ratio according to a level of the abovementioned monitoring signal received from the Master unit, while the average received-light level detection means on the Master unit detects an average received-light level of the analog optical signal received by the Master light reception means.

Thus, it is possible to detect a fault by specifying which of the uplink or downlink optical fibers has the fault based on the fluctuations in the average received-light level detected by the Master average received-light level detection means as well as fluctuations in the ratio between the above-mentioned average received-light level and the level detected by the monitoring signal-level detection means. More specifically, if, for example, an average received-light level detected by the Master unit is found to be lower than a normal reference level, the uplink optical fiber can be determined to have faults. While if, for example, a ratio of the above-mentioned monitoring signal level to the above-mentioned average received-light level is found to be lower than a normal reference value, the downlink optical fiber can be determined to have faults.

Note here that there are no restrictions on how to multiplex the above-mentioned monitoring signal and an information signal at a ratio according to the level of the above-mentioned monitoring signal received from the Master unit. The Slave unit side can multiplex those signals, thereby the Master unit side may detect optical fiber faults based on, as mentioned above, a ratio of the above-mentioned monitoring signal level to the above-mentioned average received-light level.

Moreover, a prescribed average optical power mentioned herein preferably is, for example, a constant level always, so that in the case where, for example, the average optical power of the analog optical signals sent from the Slave unit to the Master unit would fluctuate is known beforehand, the Master unit can change the reference level depending to these fluctuations so as to detect optical fiber faults accurately even if the above-mentioned average optical power fluctuates with time etc.

Moreover, one aspect allows the user of an analog optical transmission system according to the present invention to determine optical fiber faults as follows.

That is, the Master unit has its output means for outputting the user with the information of a level to be detected by the monitoring signal-level detection means and an average received-light level detected by the average received-light level detection means, thereby enabling the user to determine optical fiber faults based on the information output by the Master output means.

On such a configuration, the user who, for example, operates the Master unit can detect optical fiber faults; more specifically, the Master unit provided with an output means comprising a monitor screen etc. can, for example, display on the above-mentioned monitor screen the detection results by the above-mentioned monitoring signal-level detection means and those by the average received-light level detection means, thus allowing the user monitoring those detection results on the screen etc. to decide whether faults have occurred on optical fibers or not.

Note here that information mentioned herein on the level detected by the monitoring signal-level detection means and the average received-light level detected by the average received-light level detection means may be, for example, a level itself detected or any information to specify the level within a practical effective accuracy; in short, it may be any information as long as it enables detection of the occurrence of optical fiber faults.

Also note that an output means mentioned herein does not only refer to a monitor screen as mentioned above or other output device for outputting by means of characters, numeric characters, or graphics but various output devices such as an audio or optical power device.

In another aspect, the analog optical transmission system according to the present invention notifies the user of optical fiber faults which it has detected as follows.

That is, in the Master unit the fault detection means decides faults of the uplink optical fiber by detecting that an average received-light level detected by the average received-light level detection means has shifted off a reference level, and decides faults of the downlink optical fiber by detecting a ratio of the average received-light level detected by the average received-light level detection means to the level detected by the monitoring signal-level detection means has shifted off a reference value, so that the fault notification means may notify the user of the fault detected by the fault detection means.

On such a configuration, when an optical fiber fault can be detected by, for example, constituting the fault detection means from the CPU or the like of the Master unit, and more specifically by, for example, allowing the CPU etc. to detect a two-route optical, fiber fault based on the detection results by the average received-light level detection means as well as those by the monitoring signal-level detection means, the detection of optical fiber fault can be informed to the user by the fault notification means comprising a buzzer etc.

Note here that a reference level or value mentioned herein refers to, for example, an average received-light level when the optical fiber is normal or a ratio of the average received-light level to a monitoring signal level. The reference level or value can be used to decide an optical fiber fault if the average received-light level or the ratio of the average received-light level to the monitoring signal level has shifted from a reference level or value.

Moreover, the fault detection means utilized in the present invention need not always be composed of such a CPU as mentioned above but in short may be of any configuration as long as optical fiber faults can be detected based on a detected average received-light level or a monitoring signal level.

Furthermore, the fault information means utilized in the present invention is not always restricted to a device such as a buzzer or any other audio device as mentioned above but may be of various configurations of devices by use of characters, images, or lights.

An example of the analog optical transmission system according to the present invention may be a CATV signal repeater system for optical CATVs, utilizing CATV signals as the abovementioned information signal. The CATV signal herein is not restricted to a TV broadcasting signal transmitted from the Master unit installed at the CATV center to Slave units installed at general houses, but includes an on-demand video signal or other control signal transmitted from the Slave unit at the general houses to the Master unit at the CATV center or also may be, for example, an internet signal transferred in bilateral communication by use of cable modems etc.

In the analog optical transmission system related to the present invention, another example may be a repeater system for communication signals of cellular telephones or other mobiles, a mobile communication signal is utilized as the information signal.

Note here that the present invention is not only limited to the above-mentioned fields but can be used in other various fields that involve bilateral communication of analog optical signals by use of uplink and downlink optical fibers.

The present invention herein provides not only the above-mentioned analog optical transmission systems but also the abovementioned Master and Slave units.

That is, a Master unit according to the present invention, when executing bilateral communication of analog optical signals by use of two-route optical fibers, uplink and downlink, between itself and a Slave unit, has the Master light emission means for transmitting via the downlink optical fiber to the Slave unit an analog optical signal multiplexing a prescribed monitoring signal and an information signal to be sent to the Slave unit, and also the Master light reception means for receiving via the uplink optical fiber an analog optical signal multiplexing an information signal to be sent to the Master unit and the above-mentioned monitoring signal of the analog optical signal received via the downlink optical fiber from the Master unit by the Slave unit, so that the Master filter means separates the above-mentioned monitoring signal from the analog optical signal received by the Master light reception means and the monitoring signal-level detection means detects the level of the above-mentioned monitoring signal separated by the Master filter means, thus enabling the detection of optical fiber faults based on the fluctuations in the level detected by the monitoring signal-level detection means.

Moreover, on the Master unit according to the present invention, the above-mentioned Master light reception means receives via the uplink optical fiber an analog optical signal multiplexing at a prescribed average optical power both the abovementioned monitoring signal received from the Master unit by the Slave unit and an information signal to be sent to the Master unit at a ratio according to the level of the above-mentioned monitoring signal, and the average received-light detection means detects an average received-light level of the analog optical signal received by the Master light reception means, thus making it possible to detect a fault by specifying which of the uplink and downlink optical fibers has the fault based on the fluctuations in the average received-light level detected by the average received-light detection means and those at the ratio of the above-mentioned average received-light level to the level detected by the monitoring signal level detection means.

Furthermore, in one aspect of the above-mentioned Master unit according to the present invention, the output means outputs to the user the information of both the level detected by the monitoring signal level detection means and the average received-light level detected by the average received-light detection means, thereby enabling the user to detect optical fiber faults based on the abovementioned information provided by the output means.

In another aspect of the above-mentioned Master unit of the present invention, the fault detection means detects a fault of the uplink optical fiber when the fault detection means detects that the average received-light level detected by the average received-light detection means has shifted from a reference level, and also detects faults of the downlink optical fiber when the ratio of the average received-light level detected by the average received-light detection means to the level detected by the monitoring signal-level detection means has shifted from a reference value, thereby enabling the fault notification means to notify the user of faults detected by the fault detection means.

Moreover, in the Slave unit of the present invention, when executing during bilateral communication by use of two-route optical fibers, uplink and downlink, between itself and the Master unit, the Slave light reception means receives via the downlink optical fiber an analog optical signal multiplexing a prescribed monitoring signal and an information signal to be sent to the Slave unit from the Master unit, and the Slave filter means separates the above-mentioned monitoring signal from the analog optical signal received by the Slave light reception means, and the Slave light emission means transmits via the uplink optical fiber to the Master unit an analog optical signal multiplexing the above-mentioned monitoring signal separated by the Slave filter means and an information signal to be sent to the Master unit, thereby making it possible to detect optical fiber faults based on the fluctuations in the level of the above-mentioned monitoring signal contained in the above-mentioned analog optical signal received by the Master unit.

Furthermore, in the Slave unit of the present invention, the above-mentioned Slave light emission means transmits, at a prescribed analog optical power, an analog optical signal multiplexing the above-mentioned monitoring signal and an information signal at a ratio according to the level of the above-mentioned monitoring signal received from the Master unit, thereby making it possible to detect a fault by specifying which of the uplink optical fiber or downlink optical fiber has the fault of the optical fiber based on the fluctuations in the level of the average received light contained in the above-mentioned analog optical signal received by the Master unit and also those in the ratio of the above-mentioned average received-light level to the level of the above-mentioned monitoring signal contained in the above-mentioned analog optical signal.

Besides, in a preferred embodiment of an analog optical transmission system of the present invention, when executing bilateral communication of analog optical signals by use of two-route optical fibers, uplink and downlink, between the Master and Slave units, optical fiber faults can be detected as follows.

That is, the Master unit oscillates a monitoring signal with a frequency different from that of an information signal to be sent to the Slave unit by the oscillator, and the Master composition means synthesizes the information signal to be sent to the Slave unit and the above-mentioned monitoring signal oscillated by the oscillator, thus allowing the Master light emission means to convert the synthesized signal output from the Master composition means into an analog optical signal and transmit it to the Slave unit via the downlink optical fiber.

In the Slave unit on the other hand, the Slave light reception means receives the analog optical signal sent from the Master unit via the downlink optical fiber, and the Slave filter means separates a signal having a frequency in response to the above-mentioned monitoring signal from the analog optical signal received from the Slave light reception means, and the Slave composition means synthesizes the above-mentioned signal separated by the Slave filter means and the information signal to be sent to the Master unit, and then the Slave light emission means converts the synthesized signal output from the Slave composition means into an analog optical signal having a constant average optical power and transmits it to the Master unit via the uplink optical fiber.

In the Master unit on the other hand, the Master light reception means receives an analog optical signal sent from the Slave unit via the uplink optical fiber, and the average received-light level detection means detects the average received-light level of the analog optical signal received by the Master light reception means, and the Master filter means separates a signal having a frequency corresponding to the above-mentioned monitoring signal from the analog optical signal received by the Master light reception means, and then the monitoring signal-level detection means detects the level of the above-mentioned signal separated by the Master filter means.

Thus, it is possible to detect a fault by specifying which of the uplink optical fiber or downlink optical fiber has the fault based on the fluctuations in the level of the average received light detected by the average received-light level detection means and those in the level detected by the monitoring signal-level detection means on the Master. More specifically, for example, if the above-mentioned average received light detected by the Master unit is found to be lower than a normal reference level, the uplink optical fiber can be considered to have an fault; and if the ratio of the above-mentioned monitoring signal level to the above-mentioned average received light detected by the Master unit is found to be lower than a normal reference value, the downlink optical fiber can be considered to have a fault.

Thus, in an analog optical transmission system as well as a Master or Slave unit according to the present invention, even if, for example, the Slave unit does not monitor the downlink optical fiber, the Master unit or the user, for example, who monitors the Master unit can monitor the two-route optical fibers to detect faults. The present invention does not necessarily require both the Master and Slave units to monitor optical fibers, thereby simplifying the monitoring configuration.

BRIEF DESCRIPTION OF THE DRAWINGS

FIG. 2 shows one example of the correspondence table.

DETAILED DESCRIPTION OF THE PREFERRED EMBODIMENTS

Figure 1:
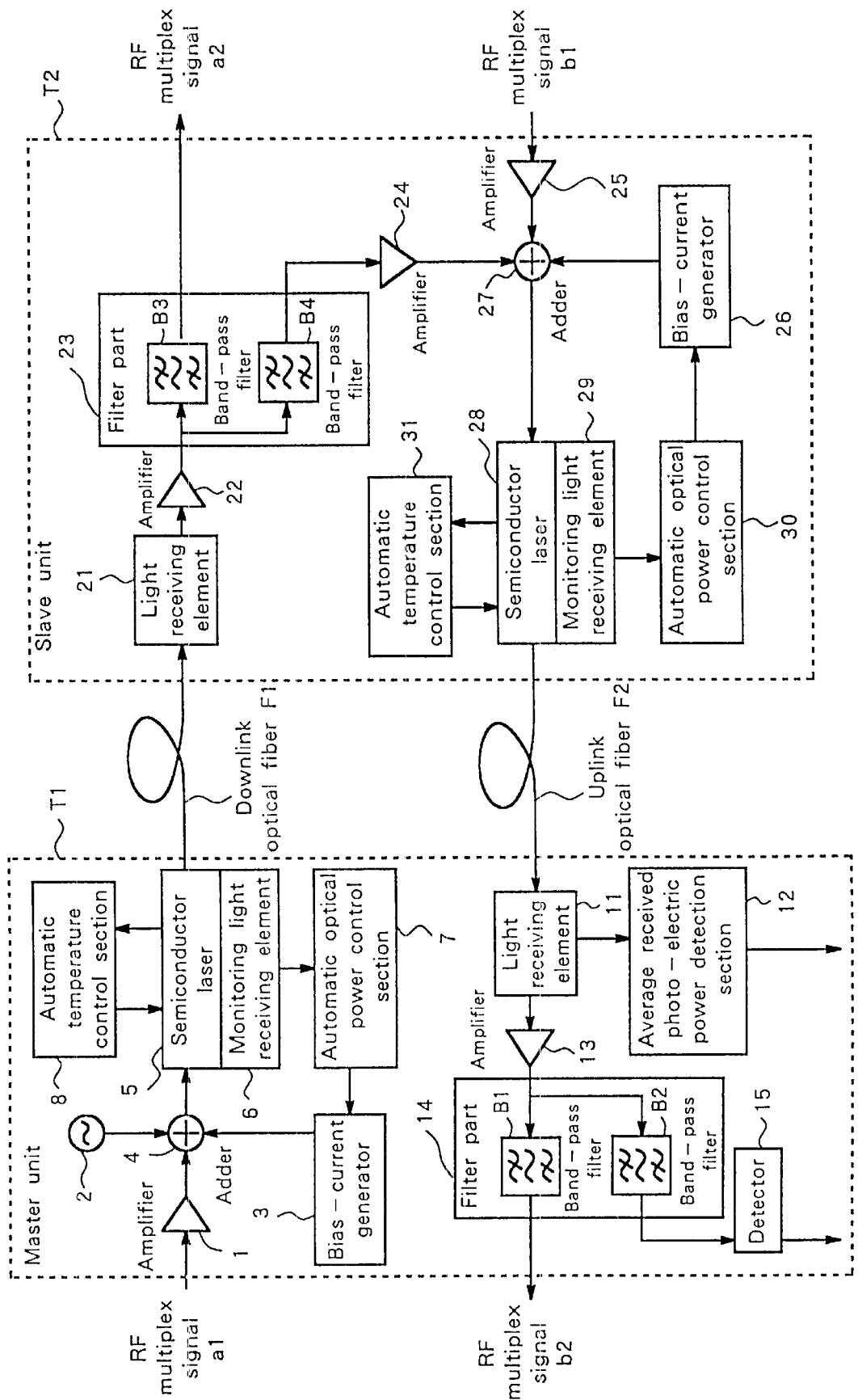
FIG. 1 is a block diagram indicative of a configuration of an analog optical transmission system related to one embodiment of the present invention.

An example according to the present invention is described with reference to the drawings.

FIG. 1 shows an example of an analog optical transmission system according to the present invention, and this analog optical transmission system is provided with a Master unit T1 and a Slave unit T2 interconnected through two-path optical fibers F2 and F1 which are for uplink and downlink transmissions, and in this example, two-way communication of analog optical signals is performed between the Master unit T1 and the Slave unit T2 using these optical fibers F2 and F1.

Moreover, for example, a case is shown where the present invention is applied to a system comprising a device which transmits and receives analog optical signals that RF (high-frequency) signals of a plurality of transmission lines are multiplexed in a manner of frequency multiplex such as a repeater for mobile communication signals, in this example.

The Master unit T1 comprises a transmission section which transmits analog optical signals and a receiving section which receives analog optical signals, wherein the transmission section is provided with: an amplifier 1 amplifying signals; an oscillator 2 oscillating the signals; a bias-current generator 3 generating a predetermined current signal; an adder 4 adding the signals; a semiconductor laser 5 (LD) emitting optical signals; a light receiving element 6 for a monitor receiving optical signals such as photodiode; an automatic optical power control section 7 (APC7) controlling the above-mentioned bias-current generator 3; and an automatic temperature control section 8 (ATC8) controlling temperature of the above-mentioned semiconductor laser 5. Moreover, for convenience in description the configuration of the receiving section of the Master unit T1 is described after the configuration of the transmission section of the Master unit T1 and that of the Slave unit T2 are described, in this example.

The amplifier 1 is provided with a function to amplify signals, for example, the RF multiplex signal a1 being sent to the Slave unit T2 is entered from the outside to amplify the RF multiplex signal a1 entered into an appropriate level and to output to the adder 4 in this example. Here, the RF multiplex signal a1 is obtained by multiplexing a plurality of RF signals in a manner of frequency multiplex.

The oscillator 2 is provided with a function to oscillate a monitoring signal having a frequency different from that of the above-mentioned RF multiplex signal a1 (that is, one outside the frequency band occupied by the RF multiplex signal a1) and in this example, outputs an oscillated high-frequency monitoring signal to the adder 4, for example. In this example, this oscillator 2 oscillates the above-mentioned monitoring signal, thereby an oscillator that oscillates monitoring signals having a frequency different from that of the information signal (RF multiplex signal a1) to be sent to the Slave unit being constituted.

In this example as the preferred embodiment, the frequency of the above-mentioned monitoring signal is set so that the RF multiplex signal a1 can not be adversely affected by mutual modulation distortion caused by non-linearity of the semiconductor laser 5 of the Master unit T1 or non-linearity of the circuit which constitutes the Slave unit T2. Moreover, in this example as the preferred embodiment, the level of the monitoring signal output from the oscillator 2 is set so that the later-described signal obtained by summing the RF multiplex signal a1 and the monitoring signal can not over-modulate the semiconductor laser 5.

The bias-current generator 3 is provided with a function to output the bias-current signals to the adder 4 under the control of the automatic optical power control section 7, whereby in this example, the automatic optical power control section 7 controls the bias-current generator 3 so that the average optical power (average photo-electric power in this example) of analog optical signals to be sent to the Slave unit T2 from the later-described semiconductor 5 can be held at a constant level.

The adder 4 is provided with a function to add signals and, in this example, the entered RF multiplex signal a1, the monitoring signal, and the bias-current signal are added and the addition signal obtained by this addition is applied to the semiconductor laser 5.

In this example, this adder 4 adds the above-mentioned RF multiplex signal a1 to the monitoring signal, thereby the Master synthesizer means which synthesizes the information signal to be sent to the Slave unit and the above-mentioned monitoring signal oscillated by the above-mentioned oscillator being constituted.

The semiconductor laser 5 is a current-driven device and has a function to output optical signals corresponding to a current applied to itself, and in this example, an addition signal output from the above-mentioned adder 4 is applied, thereby an analog optical signal corresponding to the addition signal being output to the downlink optical fiber F1 and, thereby the analog optical signal being sent to the Slave unit T2 through the downlink optical fiber F1.

In this example, the semiconductor laser 5 converts the above-mentioned addition signal into an analog optical signal and the analog optical signal is transmitted via the downlink optical fiber F1 to the Slave unit T2 by a Master light emitting means that the synthesized signal (that is, addition signal in this example) output from the above-mentioned Master synthesizer means is converted into an analog optical signal and transmitted through the downlink optical fiber to the Slave unit being constituted.

Moreover, in this example as the preferred embodiment, as mentioned above, the semiconductor laser 5 is provided with the monitoring light receiving element 6 and the automatic optical power control section 7, whereby the automatic optical power control section 7 detects the average optical power supplied to the Slave unit T2 from the semiconductor laser 5 by the monitoring light receiving element 6 to control the bias-current generator 3, thereby maintaining the average optical power of analog optical signals to be sent to the Slave unit T2 from the semiconductor laser 5 at a constant level as mentioned above.

Moreover, in this example as the preferred embodiment, as mentioned above, the semiconductor laser 5 is provided with the automatic temperature control section 8, which controls the temperature of the semiconductor laser 5, thereby stabilizing the characteristics of analog optical signals to be sent to the Slave unit T2 from the semiconductor laser 5. Here, the automatic temperature control section 8 consists of, for example, a temperature detection element or a Pertier element. Moreover, when an element which can operate stabley over a relatively wide temperature range even without control of temperature is used as the semiconductor laser 5, the above-mentioned automatic temperature control section 8 is not necessarily required to be provided.

With the above-mentioned configuration, the transmission section of the Master unit T1 synthesizes an RF multiplex signal a1 to be sent to the Slave unit T2 and a monitoring signal with a frequency different from that of this RF multiplex signal a1 and converts the resultant synthesized signal into an analog optical signal and then transmits it to the Slave unit T2 via the downlink optical fiber F1.

On the other hand, the Slave unit T2 has a reception section which receives analog optical signals and a transmission section which transmits analog optical signals and is provided with a light receiving element 21 such as a photodiode (PD) which receives optical signals, a first amplifier 22 which amplifies received signals, a filter part 23 which separates signals, a second amplifier 24 which amplifies separated signals, a third amplifier 25 which amplifies a later-described RF multiplex signal b1, a bias-current generator 26 which generates a predetermined current signal, an adder 27 which adds signals, a semiconductor laser 28 (LD28) which emits optical signals, a monitoring light receiving element 29 such as a photo-diode (PD) which receives optical signals, an automatic optical power control section 30 (APC30) which controls the above-mentioned bias-current generator 26, and an automatic temperature control section 31 (ATC31) which controls the temperature of the above-mentioned semiconductor laser 28.

For example, the light receiving element 21 has a function to demodulate received analog optical signals to electric signals, whereby, in this example, the analog optical signals sent from the semiconductor laser 5 of the Master unit T1 are received via the downlink optical fiber F1 and the received analog optical signals are output to the first amplifier 22 as RF signals, for example.

In this example, this light receiving element 21 receives analog optical signals sent from the Master unit T1 as mentioned above, thereby constituting a Slave light receiving means which receives analog optical signals sent from the Master unit via the downlink optical fiber.

The first amplifier 22 is provided with a function to amplify signals, whereby, in this example, the signals entered from the light receiving element 21 are amplified to an appropriate level and then the amplified signals are output to the filter 23. Moreover, the RF multiplex signal a1 sent from the Master unit T1 and the monitoring signal are included in a form of frequency multiplex in the signal output to the filter part 23 from the first amplifier 22.

The filter part 23 consists of, for example, two band-pass filters B3 and B4. The band-pass filter B3 in these band-pass filters is provided with a function to separate the RF multiplex signal a2 from signals entered from the first amplifier 22 and to output to the outside, for example, and the other band-pass filter B4 is provided with a function to separate signals (correspondence signals for monitoring) having a frequency corresponding to the above-mentioned monitoring signal from signals entered from the first amplifier 22 and then output the separated signals to the second amplifier 24.

Here, the RF multiplex signal a2 being separated by the above-mentioned band-pass filter B3 in these filters corresponds to the RF multiplex signal a1 sent from the Master unit T1, while the other band-pass filter B4 mentioned above separates, for example, signals having the same frequency as that of the above-mentioned monitoring signal, thereby outputting the correspondence signal for monitoring having a frequency corresponding to the monitoring signal to the second amplifier 24.

In this example, the above-mentioned latter band-pass filter B4 separates signals having a frequency which corresponds to the monitoring signal from entered signals, thereby constituting a Slave filter means which separates signals having a frequency which corresponds to the above-mentioned monitoring signal from analog optical signals entered from the above-mentioned Slave light receiving means.

Moreover, in this example, although the above-mentioned filter part 23 is shown in the case of being composed of two bandpass filters B3 and B4, the filter part 23 may be constituted by not only band-pass filters but also a combination high-pass filters with low-pass filters or the like, and in short, any configuration may be used as long as it can separate signals having a frequency which corresponds to the monitoring signal.

The second amplifier 24 is provided with a function to amplify signals, and in this example, correspondence signals for monitoring entered from the other band-pass filter B4 mentioned above are amplified to an appropriate level and amplified correspondence signal for monitoring are output to the adder 27.

The third amplifier 25 has a function to amplify signals, and in this example, an RF multiplex signal bI to be sent to the Master unit T1 is entered from the outside, for example, and the received RF multiplex signal b1 is amplified to an appropriate level and are output to the adder 27. Here, this RF multiplex signal b1 is a signal having the same configuration as the RF multiplex signal a1 to be sent from the Master unit T1 to the Slave unit T2, for example.

The bias-current generator 26 is provided with a function to output bias-current signals to the adder 27 under the control of the automatic optical power control section 30, thereby, in this example, maintaining the average optical output (average photo-electric power in this example) of analog optical signals to be sent to the Master unit T1 from the semiconductor laser 28 described below at a constant level similarly to the case of the transmission section of the Master unit T1 mentioned above.

The adder 27 is provided with a function to add signals, and in this example, an entered RF multiplex signal b1, the correspondence signal for monitoring, and a bias-current signal are added and the signal obtained by this addition is supplied to the semiconductor laser 28.

In this example, this adder 27 sums the above-mentioned RF multiplex signal b1, and the correspondence signal for monitoring, thereby constituting a Slave composition means which synthesizes a signal having a frequency which corresponds to the monitoring signal separated by the Slave filter means and an information signal (RF multiplex signal b1 in this example), to be sent to the Master unit.

The semiconductor laser 28 is a current-driven device and has a function to output optical signals corresponding to a current applied to itself, and in this example, an addition signal output from the above-mentioned adder 27 is applied, thereby an analog optical signal corresponding to the addition signal being output to the uplink optical fiber F2 and, thereby the analog optical signal being sent to the Master unit T1 through the uplink optical fiber F2. Moreover, the average optical power of analog optical signals to be sent from the semiconductor laser 28 to the Master unit T1 is maintained at a constant level as mentioned above.

In this example, this semiconductor laser 28 converts the above-mentioned addition signal into an analog optical signal and transmits it via the uplink optical fiber F2 to the Master unit T1, thereby constituting a Slave light emitting means which converts a synthesized signal (that is, addition signal in this example) output from the above-mentioned Slave composition means into an analog optical signal having a constant average optical power and transmits it to the Master unit through the uplink optical fiber.

Here, in this example, as the preferred embodiment similarly to the case of the transmission section of the Master unit T1 mentioned above, the above-mentioned semiconductor laser 28 is provided with a monitoring light receiving element 29 and an automatic optical power control section 30. Moreover, the description of the configurations or the like of the light receiving element 29 for monitoring and the automatic optical power control section 30 is omitted because it is the same as the case of the above-mentioned Master unit T1.

Moreover, the configuration of such automatic optical power control section is not particularly restricted, so that the average optical power of optical signals to be sent to the second-party unit can be maintained at a constant level as long as the average optical power of analog optical signals to be sent to the second-party side unit from the semiconductor laser is maintained at a constant level even if not being controlled, for example, from the outside, even if such light receiving element for monitoring and the automatic optical power control section as mentioned above are not provided on the Master or Slave unit.

Similar to the case of the transmission section of the Master unit T1 mentioned above, the semiconductor laser 28 in this example is provided with an automatic temperature control section 31, and the temperature of the semiconductor laser 28 is controlled, thereby stabilizing the characteristics of analog optical signals to be sent to the Master unit T1. Moreover, similar to the case of the transmission section of the Master unit T1 mentioned above, the above-mentioned automatic temperature control section 31 is not necessarily required to be provided as long as a stable operation of the semiconductor laser 28 is assured in the Slave unit T2 also.

With the above-mentioned configuration, the Slave unit T2 synthesizes a correspondence signal for monitoring separated from signals received through the downlink optical fiber F1 from the Master unit T1 and the RF multiplex signal b1 to be sent to the Master unit T1, and converts the synthesized signal obtained by this synthesis into an analog optical signal and transmits it to the Master unit T1 through the uplink optical fiber F2.

Moreover, in the Slave unit T2, the above-mentioned correspondence signal for monitoring and an RF multiplex signal b1 to be sent to the Master unit T1 are synthesized in the ratio responsive to the level of the correspondence signal for monitoring received by the Slave unit T2. In this example, the ratio of the level of the correspondence signal for monitoring in the synthesized signal with respect to the synthesized signal to be sent from the Slave unit T2 to the Master unit T1 is designed to be proportional to the level of the correspondence signal for monitoring received by the Slave unit T2.

Next, the above-mentioned transmission section of the Master unit T1 is described in terms of configuration and operations.

The reception section of the Master unit T1 is provided with a light receiving element 11 such as a photo-diode (PD) which receives optical signals, an average received photo-electric power detection section 12 which detects average received photo-electric power, an amplifier 13 which amplifies received signals, a filter part 14 which separates signals, and a detector 15 which detects signal levels.

The light receiving element 11 is provided with a function to, for example, demodulate received analog optical signals into electric signals, and in this example, analog optical signals sent to from the semiconductor laser 28 of the Slave unit T2 through the uplink optical fiber F2 are received and the received analog optical signals is output to the amplifier 13 as RF signals, for example.

In this example, this light receiving element 11 receives analog optical signals sent from the Slave unit T2 as mentioned above, thereby constituting a Master light receiving means which receives analog optical signals sent from the Slave unit through the uplink optical fiber.

The average received photo-electric power detection section 12 is provided with a function to detect the average received light level of analog optical signals received by the above-mentioned light receiving element 11, and in this example, a configuration detecting the average photo-electric power of analog optical signals entered to the light receiving element 11 via the uplink optical fiber F2 is used. Moreover, the average photo-electric power of analog optical signals entered to the light receiving element 11 can be detected using that it is the value proportional to the DC component of the electric signals demodulated from the analog optical signals, for example.

In this example, this average received photo-electric power detection section 12 detects the average photo-electric power of analog optical signals received by the light receiving element 11 as mentioned above, thereby constituting an average received-light level detection means which detects the average received-light level of analog optical signals received by said Master light receiving means.

The amplifier 13 is provided with a function to amplify signals, and in this example, the signals entered from the light receiving element 11 is amplified to an appropriate level and the amplified signals is output to the filter part 14. Moreover, in the signal output from this amplifier 13 to the filter part 14, an RF multiplex signal b1 sent from the Slave unit T2 and a correspondence signal for monitoring are included in a form of frequency multiplex.

The filter part 14 consists of, for example, two band-pass filters B1 and B2. The band-pass filter B1 in these band-pass filters is provided with a function to separate the RF multiplex signal b2 from signals entered from the amplifier 13 and to output to the outside, for example, and the other band-pass filter B2 is provided with a function to separate signals, that is, the signal corresponding to the above-mentioned correspondence signals for monitoring having a frequency corresponding to the abovementioned monitoring signal from signals entered from the amplifier 13 and to output to the detector 15.

Here, the RF multiplex signal b2 separated by the band-pass filter B1 of the above-mentioned filters is the signal which corresponds to the RF multiplex signal b1 sent from the Slave unit T2, and the above-mentioned latter band-pass filter B2 separates the signals having the same frequency as that of the above-mentioned monitoring signal, for example, thereby outputting the signals having a frequency which corresponds to the monitoring signal to the detector section 15.

In this example, the above-mentioned latter band-pass filter B2 separates the signals having the frequency which corresponds to the monitoring signal from the entered signals, thereby constituting a Master filter means separating the signals having the frequency which corresponds to the above-mentioned monitoring signal from the analog optical signals entered by the above-mentioned Master light receiving means.

Moreover, various configurations for the filter part 14 may be used similarly to the case of the above-mentioned filter part 23 of the Slave unit T2.

The detector 15 is provided with a function to detect signal levels, and in this example, the signals entered from the other band-pass filter B2 mentioned above are converted into DC signals corresponding to their electric power and the level of the above-mentioned entered signals is detected. Here, in the configuration of this example, the signals entered from the other band-pass filter B2 mentioned above to the detector section 15 become the same magnitude as or a magnitude proportional to the monitoring signal sent from the transmission section of the Master unit T1 to the Slave unit T2.

That is, in the configuration of this example, the monitoring signal sent from the Master unit T1 to the Slave unit T2 is extracted by the Slave unit T2 and the extracted monitoring signal is again transmitted (that is, returned) from the Slave unit T2 to the Master unit T1.

In this example, this detector 15 detects the level of the signals entered from the other band-pass filter B2 mentioned above, thereby constituting a monitoring signal-level detecting means which detects the level of the signals having a frequency which corresponds to the monitoring signal separated by the above-mentioned Master filter means.

With the configuration described above, the reception section of the Master unit T1 detects the average photo-electric power of analog optical signals received from the Slave unit T2 through the uplink optical fiber F2 and the level of signals having a frequency which corresponds to the above-mentioned monitoring signal separated from the analog optical signals. Moreover, the RF multiplex signal b2 is separated from analog optical signals received from the Slave unit T2.

Here, in this example, it is possible to detect irregularities by specifying either the uplink optical fiber F2 or the downlink optical fiber F1 based on the fluctuation in the average photo-electric power detected by the above-mentioned average received photoelectric power detection section 12 of the Master unit T1 and the fluctuation in the signal level detected by the detector 15, and how to detect these irregularities is described as follows.

FIG. 2 shows a correspondence table Q which provides correspondence between the results of detecting the above-mentioned average photo-electric power and the ratio of the concerned average photo-electric power to the above-mentioned signal level, and states of the uplink fiber F2 and downlink optical fiber F1. "Normal" and "Abnormal" provided in the column corresponding to the uplink optical fiber F2 and downlink optical fiber F1 indicate that the state of the respective optical fibers F2 and F1 is "normal" or "abnormal," so that an abnormal state of the optical fiber F2 or F1 means that the concerned optical fiber F2 or F1 has damages or breakpoints.

The "Average photo-electric power" column in the above-mentioned correspondence Q table indicates a "Reference level" or "Dropped," that is, to be lower than the reference level, of an average photo-electric power as detected by the above-mentioned average received photo-electric detection section 12 of the Master unit 1, where the reference level refers to a level when the uplink optical fiber F2 is in a normal state. The "ratio of average photo-electric power to signal level" column in the above-mentioned correspondence table Q indicates whether the ratio of the detected average photo-electric power to the signal level detected by the above-mentioned detector 15 is a "Reference value" or "Fluctuated" from the concerned reference value, where the reference level refers to a value when the downlink optical fiber F1 is in a normal state. Since the Master and Slave units T1 and T2 in this example are each provided with amplifiers 22, 24, 25, and 13 which amplify receive signals or transmit signals, the above-mentioned reference level or value is set in consideration of the amplification factor of these amplifiers.

In this example, the average photo-electric power detected by the average received photo-electric power detection section 12 drops below a reference level if the uplink optical fiber F2 has any damages etc., but is not affected by the state of the downlink optical fiber F1, while the signal level detected by the detection section 15 drops below a reference level (that is, a level when the optical fibers F2 and F1 are both in a normal state) if either the uplink optical fiber F2 or downlink optical fiber F1 has damages etc., so that the ratio of a detected average photo-electric power to a detected signal level fluctuates from a reference value if the downlink optical fiber F1 has damages etc., but is not affected by the state of the uplink optical fiber F2.

More specifically, when for example the uplink optical fiber F2 and downlink optical fiber F1 are both in a normal state, the average photo-electric power is, as mentioned above, detected to be a reference level and the signal level is detected to be a reference level, and also for example the ratio of the average photo-electric power to the signal level is detected to be a reference value.

Also, when for example the uplink optical fiber F2 is in a normal state and the downlink optical fiber F1 includes a fault of transmission loss increased, the average photo-electric power is detected to be a reference level, while the signal level is detected to be lower than a reference level, and the ratio of the average photo-electric power to the signal level for example is detected to be off a reference value. If, for example, the downlink optical fiber F1 is disconnected, the signal level is detected to be zero.

If, for example, uplink optical fiber F2 includes a fault of transmission loss increased but the downlink optical fiber F1 is in a normal state, both the average photo-electric power and the signal level are detected to be lower than a reference level, where since the reference level is given by a ratio of the average photo-electric power to the signal level when optical signals are transmitted from the Slave unit T2 to the Master unit T1, the reference value is also detected as the concerned ratio to be detected by the Master unit T1.

Also, if, for example, both the optical fibers F1 and F2 include a fault of transmission loss increased, both the average photo-electric power and the signal level are detected to be lower than a reference level and the ratio of the average photo-electric power to the signal level is detected to have fluctuated from a reference value. Note here that if, for example, the uplink optical fiber F2 is disconnected, the average photo-electric power and the signal level are both detected to be zero.

As mentioned above, an analog optical transmission system in this example makes it possible to detect a fault by specifying which of the two-route optical fiber F1 or F2 includes that fault based on the fluctuations in the average photo-electric power and the signal level detected by the Master unit T1, so that, for example, there is no need to provide the Slave unit with a function to, for example, monitor the optical fibers, thus making it possible to simplify the configuration for monitoring the optical fibers. Also, in the analog optical transmission system in this example, the frequency of the above-mentioned monitoring signal is different from that of the RF multiplex signal, which is originally to be transferred, so that it is possible to monitor and detect faults of the optical fibers F1 and F2 on a real-time basis and, at the same time, to transmit and receive RF multiplex signals a1 and b1, originally to be transferred, between the Master and Slave units T1 and T2 via the concerned optical fibers F1 and F2.

Moreover, another configuration can be employed that for example the CPU of the Master unit T1 would detect faults of the optical fibers F1 and F2 based on the average photo-electric power and the signal level detected by the Master unit T1 or that, for example, the user who monitors the Master unit T1 would do so. By the former configuration, for example, specifically, the reference levels for the above-mentioned average photo-electric power and the signal level are stored in the memory of the Master unit beforehand, so that when the CPU of the Master unit T1 has detected a fault of the optical fiber F1 or F2 as referring to those reference levels, it can post it to the user with a warning etc.

Furthermore, by the latter configuration, for example, specifically, the average photo-electric power and the signal level detected by the Master unit T1 can be output to the monitor screen etc., whereby through monitoring the information on the screen, the user can decide whether the optical fibers F1 and F2 include a fault or not.

Moreover, such a configuration can be employed that, for example, the Master unit T1, if has detected a fault of the optical fiber F1 or F2, may post it to the management center or that the Master unit T1 may output the average photo-electric power and the signal level it has detected to the monitor screen etc. at the management center, thus enabling the management center to concentrate the management of the state of the optical fibers F1 and F2.

Although the above-mentioned embodiments have had a configuration that optical signals may be transmitted from the Master to Slave unit or vice versa with a semiconductor laser as the light emission means; other various light emission means may be employed as long as they can transmit optical signals via optical fibers.

Moreover, likewise, as the light reception means which receives optical signals sent from the Master unit to the Slave unit or vice versa, any light reception elements may be employed as long as they can receive optical signals via optical fibers.

Furthermore, in analog optical transmission systems according to the present invention, there are no particular restrictions to the configuration which controls the processing which makes it possible to detect faults of the two-route optical fibers between the Master and Slave units, therefore, for example, such a configuration may be employed that the CPU, provided to the Master or Slave unit, executes control programs to control various processing or that each of the functional means to execute such processing comes in an independent hardware circuit.

Likewise, the configuration of analog optical transmission systems as well as Master and Slave units related to the present invention are not necessarily restricted to the above-mentioned embodiments, so that various configurations can be employed to make it possible to detect a fault by specifying which of the uplink optical fiber or downlink optical fiber includes that fault based on the fluctuations in the average photo-electric power and the signal level detected by the Master unit as mentioned earlier in the embodiments. Specifically, various configurations may be employed concerning the amplification factor of an amplifier at the Master or Slave unit which amplifies signals, optical fibers interconnecting the Master and Slave units, how to multiplex an information signal and the correspondence signal for monitoring at the Slave unit, or how the Master unit detects the average received-light level of analog optical signals received from the Slave unit or the level of signals having a frequency which corresponds to the monitoring signal.

Although the above description has explained the configuration which enables detecting a fault by specifying which of the uplink optical fiber or downlink optical fiber includes that fault, when it is enough only to detect a fault without a need to specify which of the uplink optical fiber or downlink optical fiber includes that fault, faults of the optical fiber can be detected based on the fluctuations in the level detected by the monitoring signal-level detection means of the Master unit, so that such a configuration need not necessarily be employed that detects the average received-light level of the concerned analog optical signals using as a prescribed average optical power the analog optical signal transmitted to the Master unit from the Slave unit.

Although in the above-mentioned example, as preferred embodiments, such a configuration has been described that communicates between the Master and Slave units the signal multiplexing an information signal and the monitoring signal (or correspondence signal for monitoring), when, for example, it is enough only to monitor the optical fibers without a need to monitor the optical fibers on a real-time basis while communicating information signals, such a configuration may be employed that the Master unit transmits the monitoring signal (for example, a monitoring light signal as referred to in the present invention) without multiplexing it with an information signal to the Slave unit, and the Slave unit, when it has received the concerned monitoring signal, returns it to the Master unit without multiplexing it with an information signal, so that the Master unit may detect the level of the concerned monitoring signal returned from the Slave unit so as to detect faults of the optical fibers.

Moreover, although one example of the above-mentioned embodiments has shown a case where the Master or Slave unit of an analog optical transmission system related to the present invention is applied to a repeater which optically transfer mobile communication signals for cellular telephones etc., the application of the present invention is not restricted to the above-mentioned optical transmission system which optically transfers mobile communication signals in the embodiments described above but it can be applied to various fields of systems including bilateral communication of optical signals by use of two-route optical fibers between the Master and Slave units.

One specific example may apply the present invention to such an optical CATV repeater etc. that repeats and re-transmits TV broadcasting signals or such a system that carries out bilateral communication. Another example may apply the present invention to such a system that by installing a plurality of Slave units interconnected with the Master unit via optical fibers within the tunnel of a subway beforehand, each Slave unit can carry out wireless communication with cellular telephones etc. in a subway train, thus allowing those cellular telephones to communicate with the Master unit via the Slave units or such a system that using almost the same configuration, the subway train driver can communicate with the manager at the Master unit via the Slave units.

As mentioned above, with an analog optical transmission system as well as Master and Slave units related to the present invention, during the bilateral communication of analog optical signals by use of two-route optical fibers, up and down, between Master and Slave units, the Master unit can transmit a monitoring light signal via the downlink optical fiber to the Slave unit, while the Slave unit returns the concerned monitoring signal it has received to the Master unit via the uplink fiber to permit the Master unit to detect the level of the concerned monitoring signal it has received, thus enabling the Master unit side to detect faults of the optical fibers based on the fluctuations in the concerned level.

More, with another analog optical transmission system as well as Master and Slave units related to the present invention, during the bilateral communication of analog optical signals by use of two-route optical fibers, up and down, between Master and Slave units, the Master unit transmits an analog optical signal multiplexing an information signal and the monitoring signal to the Slave unit via the downlink optical fiber, while the Slave unit transmits to the Master unit via the uplink optical fiber an analog signal multiplexing an information signal and the above-mentioned monitoring signal separated from the concerned analog optical signal it has received, to permit the Master unit to detect the level of the above-mentioned monitoring signal separated from the concerned analog optical signal, thus enabling the Master unit side to detect faults of the optical fibers based on the fluctuations in the concerned level.

Moreover, with another analog optical transmission system as well as Master and Slave units related to the present invention, moreover, the Slave unit transmits to the Master unit at a prescribed average optical power an analog optical signal multiplexing an information signal and the above-mentioned monitoring signal at a ratio which corresponds to the level of the above-mentioned monitoring signal it has received from the Master unit, while the Master unit detects the average received-light level of the concerned analog optical signals it has received from the Slave unit, so that it is possible for the Master unit side to detect a fault by specifying which of the uplink optical fiber or downlink optical fiber includes that fault based on the fluctuations in the concerned average received-light level and those in the ratio of the concerned average received-light level to the above-mentioned monitoring signal level.

Furthermore, with another analog optical transmission system and a Master unit related to the present invention, the Master unit outputs to the user the information of the monitoring signal level and the average received-light level detected as mentioned above, thereby enabling the user to specify faults of the optical fibers based on the concerned information.

Besides, another analog optical transmission system and a Master unit related to the present invention, the Master unit detects a fault of the optical fibers based on the average received-light level or the monitoring signal level detected as mentioned above and then posts it to the user, thus enabling him to specify the fault.

Still more, on another analog optical transmission system related to the present invention, during the bilateral communication of analog optical signal by use of two-route optical fibers, up and down, between Master and Slave units, the Master unit converts into an analog optical signal a synthesized signal synthesizing an information signal and a monitoring signal having a frequency different from that of the information signal and then transmits the analog optical signal to the Slave unit via the downlink optical fiber, while on the other hand the Slave unit coverts, into an analog optical signal having a constant average optical power, a synthesized signal synthesizing the information signal and the signal having a frequency which corresponds to the above-mentioned monitoring signal separated from the concerned analog signal it has received and then transmits the concerned analog optical signal to the Master unit via the uplink optical fiber, to permit the Master unit to detect the average received-light level of the concerned analog optical signal so as to detect the level of the signal having a frequency which corresponds to the above-mentioned monitoring signal separated from the concerned analog optical signal, so that even if for example the Slave unit should not monitor the optical fibers, it is possible for the Master unit to detect a fault by specifying which of the uplink optical fiber or downlink optical fiber includes that fault based on the results of detecting the above-mentioned average received-light level and the monitoring signal level.

What is claimed is:

1. An analog optical transmission system for bilateral communication of analog optical signals using two-route optical fibers, uplink and downlink, between a Master unit and a Slave unit;

said Master unit comprising:
   an oscillator for oscillating a monitoring signal having a frequency different from that of an information signal to be transmitted to said Slave unit;
   a Master composition means for synthesizing an information signal to be transmitted to said Slave unit and said monitoring signal oscillated by said oscillator;
   a Master light emission means for converting a synthesized signal output from said Master composition means into an analog optical signal and then transmitting said analog optical signal to said Slave unit via a downlink optical fiber;
   a Master light reception means for receiving analog optical signals transmitted from said Slave unit via an uplink optical fiber;
   an average received-light level detection means for detecting an average received-light level of analog optical signals received by said Master light reception means;
   a Master filter means for separating signals having a frequency corresponding to said monitoring signal from analog optical signals received by said Master light reception means; and
   a monitoring signal-level detection means for detecting a level of said signals separated by said Master filter means;

said Slave unit comprising:
   a Slave light reception means for receiving analog optical signals transmitted from said Master unit via said downlink optical fiber;
   a Slave filter means for separating signals having a frequency corresponding to said monitoring signal from analog optical signals received by said Slave light reception means;
   a Slave composition means for synthesizing said signals separated by said Slave filter means and an information signal to be transmitted to said Master unit; and
   a Slave light emission means for converting a synthesized signal output from said Slave composition means into an analog optical signal having a constant average optical power and then transmitting said analog optical signal to said Master unit via said uplink optical fiber;

wherein it is thus possible to detect an fault by specifying which of said uplink optical fiber or downlink optical fiber includes the fault based on fluctuations in an average received-light level detected by said average received-light level detection means fo said Master unit and fluctuations in a level detected by said monitoring signal-level detection means.

2. An analog optical transmission system for bilateral communication of analog optical signals between a master unit and a slave unit by use of uplink and downlink optical fibers, wherein:

said master unit comprises:
   an oscillator operable to oscillate a monitoring signal having a frequency different from that of an information signal to be transmitted to said slave unit;
   a master composition device operable to synthesize an information signal to be transmitted to said slave unit and the monitoring signal oscillated by said oscillator;
   a master light emission device operable to convert a synthesized signal output from said master composition device into an analog optical signal and then transmitting the analog optical signal to said slave unit via said downlink optical fiber;

a master light reception device operable to receive analog optical signals transmitted from said slave unit via said uplink optical fiber;

an average received-light level detection device operable to detect an average received-light level of analog optical signals received by said master light reception device;

a master filter device operable to separate signals having a frequency corresponding to the monitoring signal from analog optical signals received by said master light reception device; and a monitoring signal-level detection device operable to detect a level of the signals separated by said master filter device;

said slave unit comprises:

a slave light reception device operable to receive analog optical signals transmitted from said master unit via said downlink optical fiber;

a slave filter device operable to separate signals having a frequency corresponding to the monitoring signal from analog optical signals received by said slave light reception device;

a slave composition device operable to synthesize the signals separated by said slave filter device and an information signal to be transmitted to said master unit; and a slave light emission device operable to convert a synthesized signal output from said slave composition device into an analog optical signal having a constant average optical power and then transmitting the analog optical signal to said master unit via said uplink optical fiber;

wherein it is possible to detect a fault by specifying which of said uplink optical fiber or downlink optical fiber includes the fault based on fluctuations in an average received-light level detected by said average received-light level detection device of said master unit and fluctuations in a level detected by said monitoring signal-level detection device.

3. The analog optical transmission system according to claim 2, wherein said master unit further comprises a first automatic temperature control device operable to control a temperature of said master light emission device, and wherein said slave unit further comprises a second automatic temperature control device operable to control a temperature of said slave light emission device.

4. An analog optical transmission system for bilateral communication of analog optical signals between a master unit and a slave unit by use of uplink and downlink optical fibers, wherein:

said master unit comprises:

a master light emission device operable to transmit, to said slave unit via said downlink optical fiber, an analog optical signal multiplexing a prescribed monitoring signal and an information signal to be transmitted to said slave unit;

a master light reception device operable to receive an analog optical signal transmitted from said slave unit via said uplink optical fiber;

a master filter device operable to separate the monitoring signal from the analog optical signal received by said master light reception device; and a monitoring signal-level detection device operable to detect a level of the monitoring signal separated by said master filter device;

said slave unit comprises:

a slave light reception device operable to receive analog optical signals transmitted from said master unit via said downlink optical fiber;

a slave filter device operable to separate the monitoring signal from analog optical signals received by said slave light reception device; and a slave light emission device operable to transmit, to said master unit via said uplink optical fiber, an analog optical signal multiplexing the monitoring signal separated by said slave filter device and an information signal to be transmitted to said master unit;

wherein it is possible to detect faults of said uplink and downlink optical fibers based on fluctuations of a level detected by said monitoring signal-level detection device at said master unit;

wherein said slave light emission device of said slave unit transmits, with a prescribed average optical power, an analog optical signal multiplexing the monitoring signal and an information signal at a ratio of that corresponding to a level of the monitoring signal received from said master unit;

wherein said master unit is provided with an average received-light level detection device operable to detect an average received-light level of analog optical signals received by said master light reception device; and wherein it is possible to detect a fault specifying which of said uplink optical fiber or said downlink optical fiber includes the fault based on a fluctuation in an average received-light level detected by said average received-light level detection device of said master unit and fluctuations in a ratio of the average received-light level to a level detected by said monitoring signal-level detection device.

5. The analog optical transmission system according to claim 4, wherein:

said master unit is provided with an output operable to output, to a user, information of a level detected by said monitoring signal-level detection device and information of an average received-light level detected by said average received-light level detection device; and it is possible for the user to know about faults of the uplink and downlink optical fibers based on the information output by said output device of said master unit.

6. The analog optical transmission system according to claim 4, wherein said master unit further comprises:

a fault detection device operable to detect faults of said uplink optical fiber in response to fluctuations, from a reference level, of an average received-light level detected by said average received-light level detection device and detect faults of said downlink optical fiber in response to fluctuations, from a reference value, of a ratio of an average received-light level detected by said average received-light level detection device to a level detected by said monitoring signal-level detection device; and a fault notification device operable to notify a user of faults detected by said fault detection device.

7. The analog optical transmission system according to claim 4, wherein said analog optical transmission system is a CATV signal repeater system, and the information signal is a CATV signal.

8. The analog optical transmission system according to claim 4, wherein said analog optical transmission system is a mobile communication repeater system and the information signal is a mobile communication signal.

9. A master unit for carrying out bilateral communication of analog optical signals with a slave unit by using uplink and downlink optical fibers, said master unit comprising:

a master light emission device operable to transmit, to the slave unit via the downlink optical fiber, an analog optical signal multiplexing a prescribed monitoring signal and an information signal to be transmitted to the slave unit;

a master light reception device operable to receive, via the uplink optical fiber, an analog optical signal multiplexing an information signal to be transmitted to said master unit and the monitoring signal contained in analog optical signals received from said master unit via the downlink optical fiber by the slave unit;

a master filter device operable to separate the monitoring signal from analog optical signals received by said master light reception device; and a monitoring signal-level detection device operable to detect a level of the monitoring signal separated by said master filter device;

wherein it is possible to detect faults of the uplink and downlink optical fibers based on fluctuations of a level detected by said monitoring signal-level detection device;

wherein said master light reception device receives, at a prescribed average optical power via the uplink optical fiber, an analog optical signal multiplexing the monitoring signal received from said master unit by the slave unit and an information signal to be transmitted to said master unit at a ratio of that corresponding to a level of the monitoring signal;

wherein said master unit is provided with an average received-light level detection device operable to detect an average received-light level of analog optical signals received by said master light reception device; and wherein it is possible to detect a fault by specifying which of the uplink optical fiber or downlink optical fiber includes the fault based on fluctuations in an average received-light level detected by said average received-light detection device and fluctuations in a ratio of the average received-light level to a level detected by said monitoring signal-level detection device.

10. The master unit according to claim 9, further comprising an output device operable to output, to a user, information of a level detected by said monitoring signal-level detection device and information of an average received-light level detected by said average received-light level detection device; and wherein it is possible for the user to know about faults of the uplink and downlink optical fibers based on the information output by said output device.

11. The master unit according to claim 9, further comprising:

a fault detection device operable to detect faults of the uplink optical fiber in response to fluctuations, from a reference level, of an average received-light level detected by said average received-light level detection device and detect faults of the downlink optical fiber in response to fluctuations, from a reference value, of a ratio of an average received-light level detected by said average received-light level detection device to a level detected by said monitoring signal-level detection device; and a fault notification device operable to notify a user of faults detected by said fault detection device.

12. A slave unit for carrying out bilateral communication of analog optical signals with a master unit by using uplink and downlink optical fibers, said slave unit comprising:

a slave light reception device operable to receive, via the downlink optical fiber, an analog optical signal multiplexing a prescribed monitoring signal and an information signal to be transmitted to said slave unit by the master unit;

a slave filter device operable to separate the monitoring signal from analog optical signals received by said slave light reception device; and a slave light emission device operable to transmit, to the master unit via the uplink optical fiber, an analog optical signal multiplexing the monitoring signal separated by said slave filter device and an information signal to be transmitted to the master unit;

wherein it is possible to detect faults of the uplink and downlink optical fibers based on fluctuations of a level of the monitoring signal contained in the analog optical signal received by the master unit;

wherein said slave light emission device transmits, at a prescribed average optical power, an analog optical signal multiplexing the monitoring signal and an information signal at a ratio of that corresponding to a level of the monitoring signal received from the master unit; and wherein it is possible to detect a fault by specifying which of the uplink optical fiber or downlink optical fiber includes the fault based on fluctuations in an average received-light level of the analog optical signal received by the master unit and fluctuations in a ratio of the average received-light level to a level of the monitoring signal contained in the analog optical signal.

* * * * *